(12) United States Patent
Lee et al.

(10) Patent No.: US 7,320,454 B2
(45) Date of Patent: Jan. 22, 2008

(54) DISPLAY SUPPORTING APPARATUS

(75) Inventors: You-sub Lee, Kunpo (KR); Sang-hyun Han, Suwon (KR); Sang-hak Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 99 days.

(21) Appl. No.: 10/695,351

(22) Filed: Oct. 29, 2003

(65) Prior Publication Data
US 2004/0135050 A1    Jul. 15, 2004

(30) Foreign Application Priority Data
Oct. 30, 2002   (KR)   .............. 10-2002-0066643

(51) Int. Cl.
B42F 13/00   (2006.01)
(52) U.S. Cl. ............... 248/343; 248/291.1; 248/274.1; 248/309.1; 248/317; 248/323
(58) Field of Classification Search ............... 248/333, 248/317, 323, 324, 121, 122.1, 917, 918, 248/922, 923, 343, 291.1, 274.1, 178.1; 361/681
See application file for complete search history.

(56) References Cited

U.S. PATENT DOCUMENTS

| | | | |
|---|---|---|---|
| 4,964,606 A | 10/1990 | Beam et al. | 248/333 |
| 5,310,152 A * | 5/1994 | O'Neill | 248/329 |
| D377,897 S * | 2/1997 | Vogels | D8/373 |
| D395,892 S * | 7/1998 | Solomon | D14/224 |
| 6,328,270 B1 * | 12/2001 | Elberbaum | 248/288.31 |
| 6,443,412 B1 * | 9/2002 | Kuhn | 248/343 |
| 6,639,789 B2 * | 10/2003 | Beger | 361/681 |
| 6,817,585 B2 * | 11/2004 | Wagner et al. | 248/324 |

FOREIGN PATENT DOCUMENTS

| | | |
|---|---|---|
| JP | 6-326947 | 11/1994 |
| JP | 10-9489 | 1/1998 |
| JP | 2001-147646 | 5/2001 |
| JP | 2001-309276 | 11/2001 |
| KR | 20-241392 | 10/2001 |
| KR | 20-279075 | 6/2002 |

* cited by examiner

*Primary Examiner*—Carl D. Friedman
*Assistant Examiner*—Todd M. Epps
(74) *Attorney, Agent, or Firm*—Staas & Halsey LLP

(57) ABSTRACT

A display supporting apparatus includes an upper engaging part mounted on a ceiling, a swivel adjusting part rotatably combined with bottom of the upper engaging part, a flange member combined with the upper engaging part to support the swivel adjusting part, a first engaging pipe extended downward from the swivel adjusting part, and a display mounting part combined with a bottom of the first engaging pipe to mount a display thereon. Accordingly, the present invention includes a display supporting apparatus to support a large-sized display in a stable manner without a separate casing for the display, and further provides swiveling, tilting and height adjustment of a display with the use of engaging pipes.

18 Claims, 7 Drawing Sheets

DISPLAY SUPPORTING APPARATUS

CROSS-REFERENCE TO RELATED APPLICATIONS

This application claims the benefit of Korean Patent Application No. 2002-66643, filed Oct. 30, 2002, in the Korean Intellectual Property Office, the disclosure of which is incorporated herein by reference.

BACKGROUND OF THE INVENTION

1. Field of the Invention

The present invention relates to an apparatus to support a display, allowing for a swiveling, tilting and height-adjusting the display. More particularly, the present invention relates to a supporting apparatus for a panel-type large-sized display such as an LCD (Liquid Crystal Display) or a PDP (Plasma Display Panel).

2. Description of the Related Art

Conventionally, there have been display supporting apparatuses capable of swiveling, tilting and/or height adjusting a display unit mounted on a ceiling. The display unit employing the conventional display supporting apparatus usually includes a medium- or small-sized monitor having a cathode ray tube, and a separate casing to receive the monitor. A swiveling movement of the monitor is allowed with the use of the casing.

However, it is inconvenient to employ the conventional display supporting apparatus for a panel type large-sized display because there are needed not only a separate large-sized casing to receive the panel type large-sized monitor but also enough force to withstand weight of both the large-sized casing and the large-sized monitor.

SUMMARY OF THE INVENTION

Accordingly, it is an aspect of the present invention to provide a display supporting apparatus to support a display so that the display is swiveled, tilted and height-adjusted due to a structure of an engaging pipe used to support a weight of the display without the use of a separate large-sized casing.

Additional aspects and advantages of the invention will be set forth in part in the description which follows and, in part, will be obvious from the description, or may be learned by practice of the invention.

The foregoing and/or other aspects of the present invention are achieved by providing a display supporting apparatus including an upper engaging part mounted on a ceiling, a swivel adjusting part rotatably combined with a bottom of the upper engaging part, a flange member combined with the upper engaging part to support the swivel adjusting part, a first engaging pipe extended downward from the swivel adjusting part, and a display mounting part combined with a bottom of the first engaging pipe to mount a display thereon.

According to an aspect of the present invention, the upper engaging part includes a mounting plate provided with a plurality of first engaging holes to mount on the ceiling, a trunk part having a hollow projection to project from a center part of the mounting plate and having on the bottom thereof, at least one pair of second engaging holes to couple to the flange member, and a supporting rib combined with the mounting plate and the trunk part to support a weight of the display.

According to an aspect of the present invention, the swivel adjusting part includes a plate provided with a through hole having a diameter equal to an external diameter of the trunk part of the upper engaging part, and an engaging part bent downward from an edge of the plate, and being provided with at least one pair of engaging holes to couple to the first engaging pipe.

According to an aspect of the present invention, the flange member includes a trunk part having a hollow inside, an external diameter to correspond to an internal diameter of the trunk part of the upper engaging part and provided with at least one pair of engaging holes to couple to the trunk part of the upper engaging part, and a flange projected from the bottom of the trunk part of the upper engaging part to support the swivel adjusting part.

According to an aspect of the present invention, the trunk part of the flange member includes a male screw on a top outside thereof, and the trunk part of the upper engaging part includes a female screw on a bottom inside thereof to correspond to the male screw.

According to an aspect of the present invention, the trunk part of the flange member is provided with a flat face on the male screw on which an engaging pin passing through the second engaging hole of the upper engaging part is seated.

According to an aspect of the present invention, the first engaging pipe includes a trunk part having a hollow inside and an external diameter to correspond to an internal diameter of the engaging part of the swivel adjusting part, at least one pair of first engaging holes provided on a top of the trunk part to couple to the engaging part of the swivel adjusting part, and at least two pairs of second engaging holes provided on the bottom of the trunk part to couple to the display mounting part.

According to an aspect of the present invention, the trunk part of the first engaging pipe includes a male screw on the top thereof to enhance a force of coupling the trunk part to the swivel adjusting part, and the engaging part of the swivel adjusting part includes a female screw on an inside thereof to correspond to the male screw of the first engaging pipe.

According to an aspect of the present invention, the first engaging pipe includes an external diameter smaller than the internal diameter of the engaging part of the swivel adjusting part, which has an internal diameter within which a female screw corresponding to the male screw of the first engaging pipe is provided, and an external diameter within which a male screw corresponding to the female screw of the swivel adjusting part is provided. The first engaging pipe also includes a nut on the outside thereof on which the male screw is provided. The nut is provided with a flat face on which the engaging pin passing the engaging holes of the swivel adjusting part is seated.

According to an aspect of the present invention, the display mounting part includes a mounting plate provided with a plurality of first engaging holes to couple to the first engaging pipe, and left and right engaging parts respectively having a plurality of second engaging holes to mount the display.

According to an aspect of the present invention, the display supporting apparatus further includes a second engaging pipe having an external diameter to correspond to the internal diameter of the first engaging pipe, and provided with a trunk part having a hollow inside to couple to the first engaging pipe, at least one pair of first engaging holes to couple to the bottom of the first engaging pipe, and at least two pairs of second engaging holes on the bottom of the trunk part to couple to the display mounting part. The second engaging pipe is configured to adjust the height of the display.

According to an aspect of the present invention, the display supporting apparatus further includes a third engaging pipe having an external diameter and internal diameter to correspond to the external and internal diameter of the first engaging pipe, and provided with a trunk part having a hollow inside to couple to the second engaging pipe, at least one pair of first engaging holes to couple to the bottom of the second engaging pipe, and at least two pairs of second engaging holes provided on the bottom of the trunk part to couple to the display mounting part. The third engaging pipe is configured to adjust the height adjustment of the display.

According to an aspect of the present invention, at least two pairs of engaging holes are provided on the bottom of at least one of the first, second, and third engaging pipes, and the display supporting apparatus further includes a tilt adjusting part having a plate provided so that the at least one of the first, second, and third engaging pipes is coupled thereto, a first engaging hole provided on the plate to couple to the display mounting part, a plurality of second engaging holes to couple to the at least one of the first, second, and third engaging pipes, allowing tilt adjustment of the display and third engaging holes to couple to the at least one of the first, second, and third engaging pipes.

According to another aspect of the present invention, the foregoing and/or other aspects of the present invention are achieved by providing a display mounted on the above described display supporting apparatuses.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENT

Figure 1:
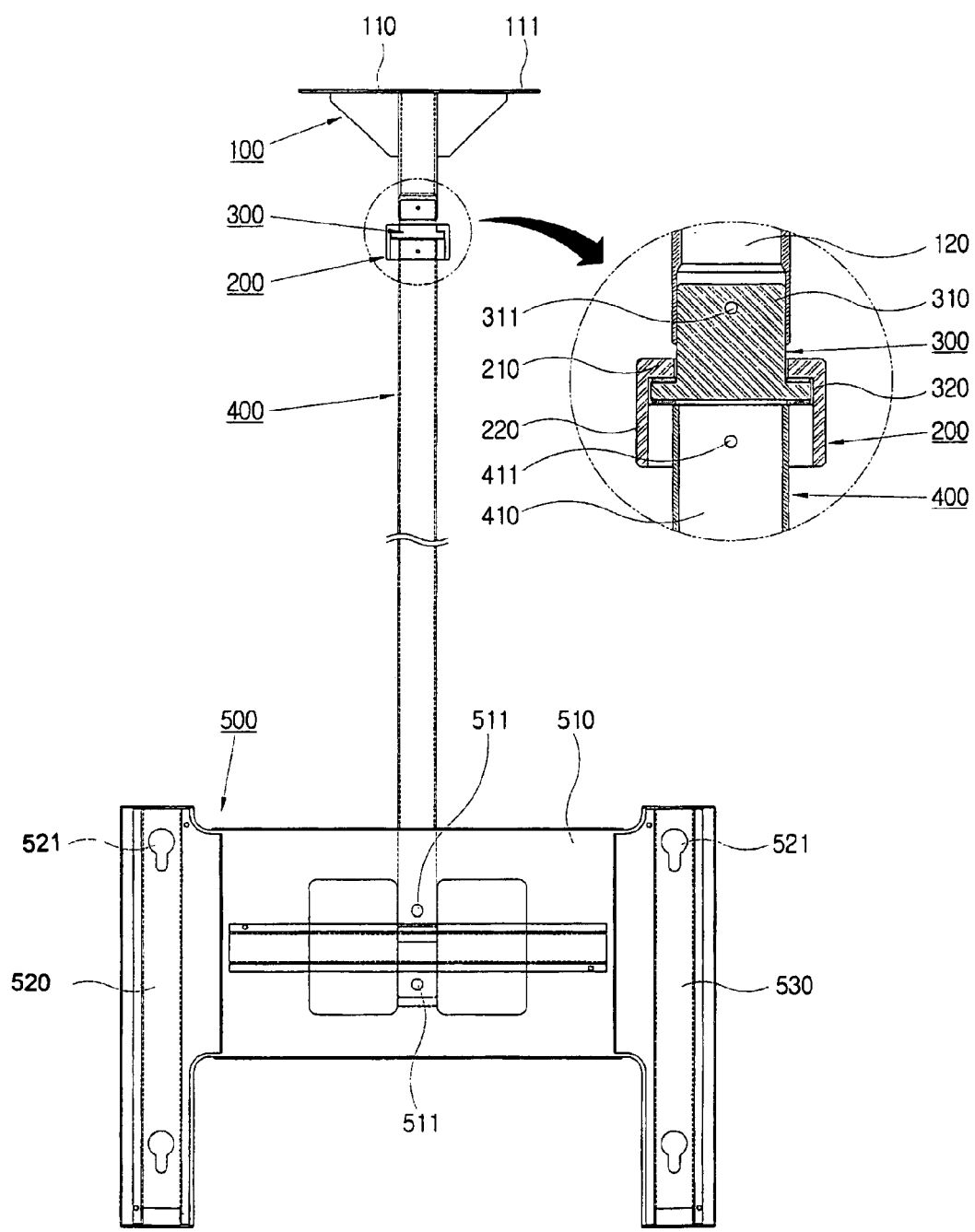
FIG. 1 shows a front view and a partially enlarged view of a display supporting apparatus, according to an embodiment of the present invention.

Reference will now be made in detail to the embodiments of the present invention, examples of which are illustrated in the accompanying drawings, wherein like reference numerals refer to like elements throughout.

Figure 2:
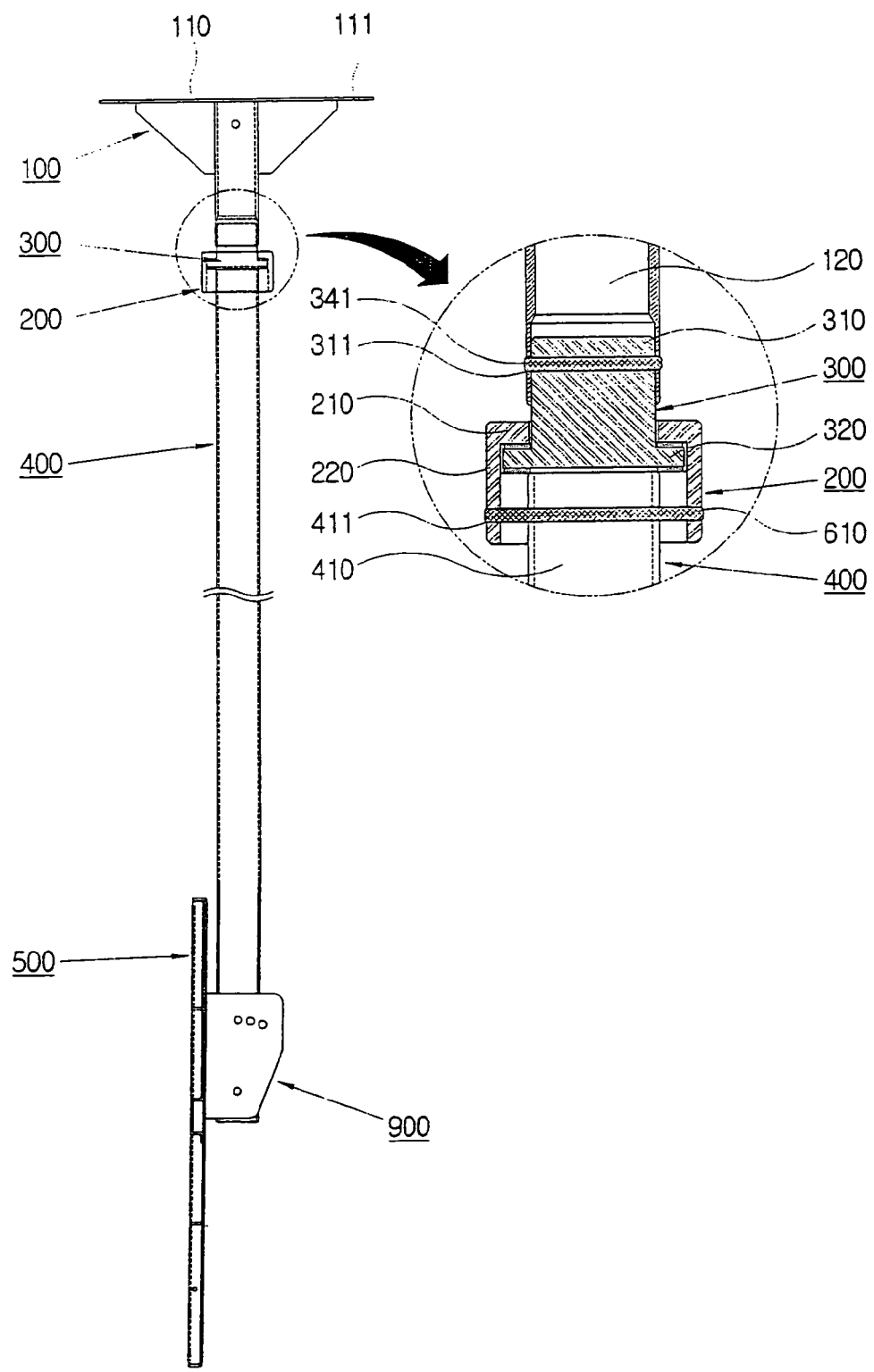
FIG. 2 shows a side view and a partially enlarged view of the display supporting apparatus of FIG. 1.
Figure 3:
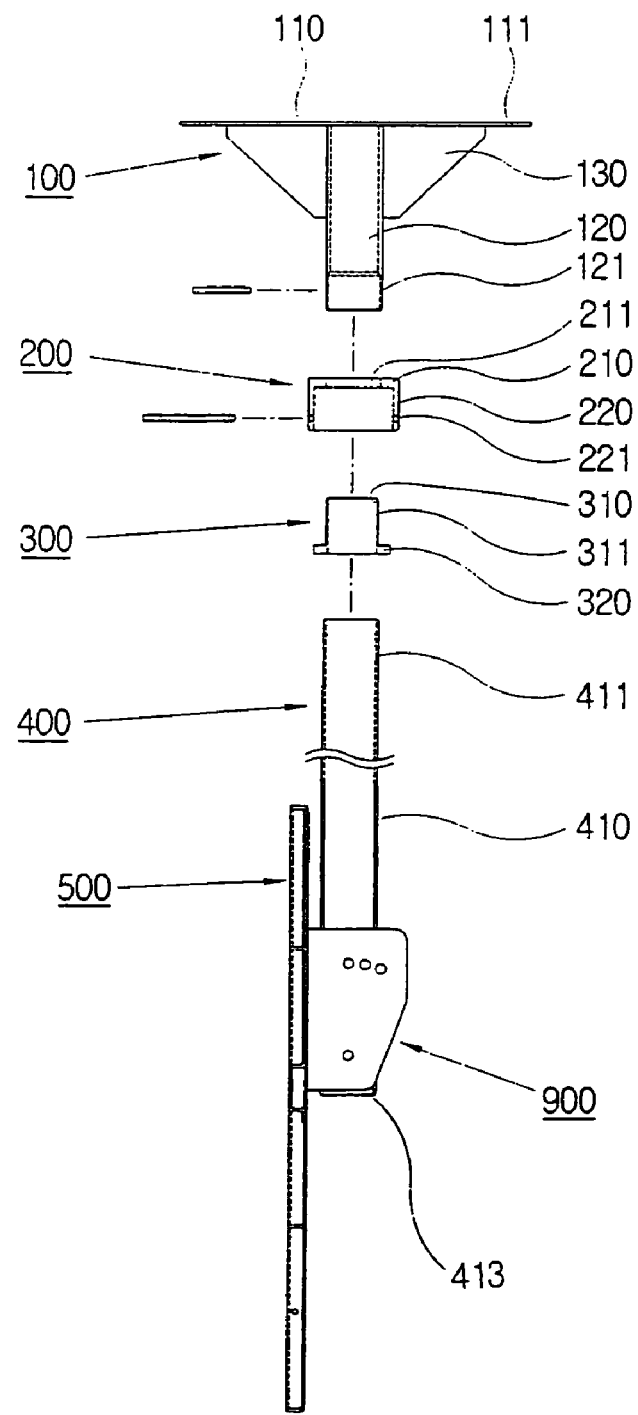
FIG. 3 is an exploded view of the display supporting apparatus of FIG. 1.

As shown in FIGS. 1 through 3, a display supporting apparatus according to the present invention includes an upper engaging part 100, a swivel-adjusting part 200, a flange member 300, a first engaging pipe 400 and a display mounting part 500. The upper engaging part 100 includes a mounting plate 110, a trunk part 120 and a supporting rib 130.

The mounting plate 110 may be circular or rectangular in shape, and has a plurality of first engaging holes 111 around the edge thereof, through which the mounting plate 110 is able to be mounted to a ceiling. The trunk part 120 has a hollow projection to project from the mounting plate 110, and at least one pair of second engaging holes 121 on a bottom thereof to couple to the flange member 300. Engaging pins 341 are provided to pass through the at least one pair of second engaging holes 121 for engagement. A force to support a display will be enhanced as a number of the second engaging holes 121 and the engaging pins is increased. The supporting rib 130 is connected to the mounting plate 110 and a top of the trunk part 120, thereby enhancing a force to withstand a weight of the display.

The swivel adjusting part 200 includes a plate 210 and an engaging part 220. The plate 210 is provided to withstand the weight of the display and has in its center a through hole 211 having a diameter to correspond to an external diameter of the upper engaging part 100. The engaging part 220 has at least one pair of engaging holes 221 to engage with the first engaging pipe 400. As shown, the first engaging pipe 400 may be connected to the engaging part 220, and is extended downward in an elongated manner with which the display may be directly mounted.

The flange member 300 includes a trunk part 310 and a flange 320 which is provided at the bottom of the trunk part 120 of the upper engaging part 100. The trunk part 120 of the upper engaging part 100 is coupled to the mounting plate 110 after the swivel adjusting part 200 is coupled to the trunk part 120. However, for simplification of a coupling process, it is desirable that the flange member 300 is separately provided and coupled to the bottom of the trunk part 120 of the upper engaging part 100. The coupling process may be performed by allowing the upper engaging part 100 to pass through an inside of the flange member 300. However, in this case, since a size and weight of the flange member 300 would have to be increased, it is not appropriate for the display supporting apparatus. Therefore, it is preferable for the flange member 300 to pass through an inside of the upper engaging part 100.

On the top of the trunk part 310 are provided at least one pair of engaging holes 311 through which the trunk part 310 is coupled to the bottom of the trunk part 120 of the upper engaging part 100. The flange 320 contacts the plate 210 of the swivel adjusting part 200 to which the weight of the display is applied. A swiveling of the display is performed based on the contact of the flange 320 and the plate 210.

The first engaging pipe 400 includes a trunk part 410 having a hollow pipe. On a top of the trunk part 410 is provided at least one pair of first engaging holes 411 to couple to the engaging part 220 of the swivel adjusting part 200. On a bottom of the trunk part 410 is provided at least two pairs of second engaging holes 413 to mount the display. The more engaging holes used in the display supporting apparatus, the larger the force of withstanding the weight of the display.

The display mounting part 500 includes a mounting plate 510, a left engaging part 520 and a right engaging part 530. The display may be directly mounted on the first engaging pipe 400. However, in this case, a separate device has to be attached to the display itself. In this regard, it is preferable to mount the display on the display mounting part 500.

The mounting plate 510 has a plurality of first engaging holes 511 through which the mounting plate 510 is coupled with the bottom of the first engaging pipe 400. Preferably, positions of the engaging holes 510 are depressed to a predetermined length so that they do not impede on the mounting of the display.

On opposite sides of the mounting plate 510 are provided the left engaging part 520 and the right engaging part 530, both having a plurality of second engaging holes 521 through which the mounting of the display is allowable.

Hereinbelow, an assembling process of the display supporting apparatus, according to an embodiment of the present invention as shown in FIGS. 1 through 3, will be described.

The upper engaging part 100 is first coupled to the ceiling through the first engaging holes 111 of the mounting plate 110.

The flange member 300 which is contacted to the swivel adjusting part 200 is inserted into the bottom of the trunk part 120 of the upper engaging part 100. For this purpose, the upper engaging part 100 is located such that its second engaging holes 121 correspond to the engaging holes 311 of the flange member 300, and the corresponding holes are engaged with engaging pins 341.

The first engaging pipe 400 is inserted into the inside of the swivel adjusting part 200. The first engaging pipe 400 is located such that its first engaging holes 411 correspond to the engaging holes 221 of the swivel adjusting part 200, and the corresponding holes are engaged with engaging pins 610.

The second engaging holes 413 provided on the bottom of the first engaging pipe 400 are located to correspond to the first engaging holes of the display mounting part 500, and the corresponding holes are engaged by engaging pins (not shown).

Lastly, the display is mounted on the display mounting part 500 via the second engaging holes 521 provided on the left engaging part 520 and the right engaging part 530 of the display mounting part 500, thereby allowing the display to swivel.

Figure 4:
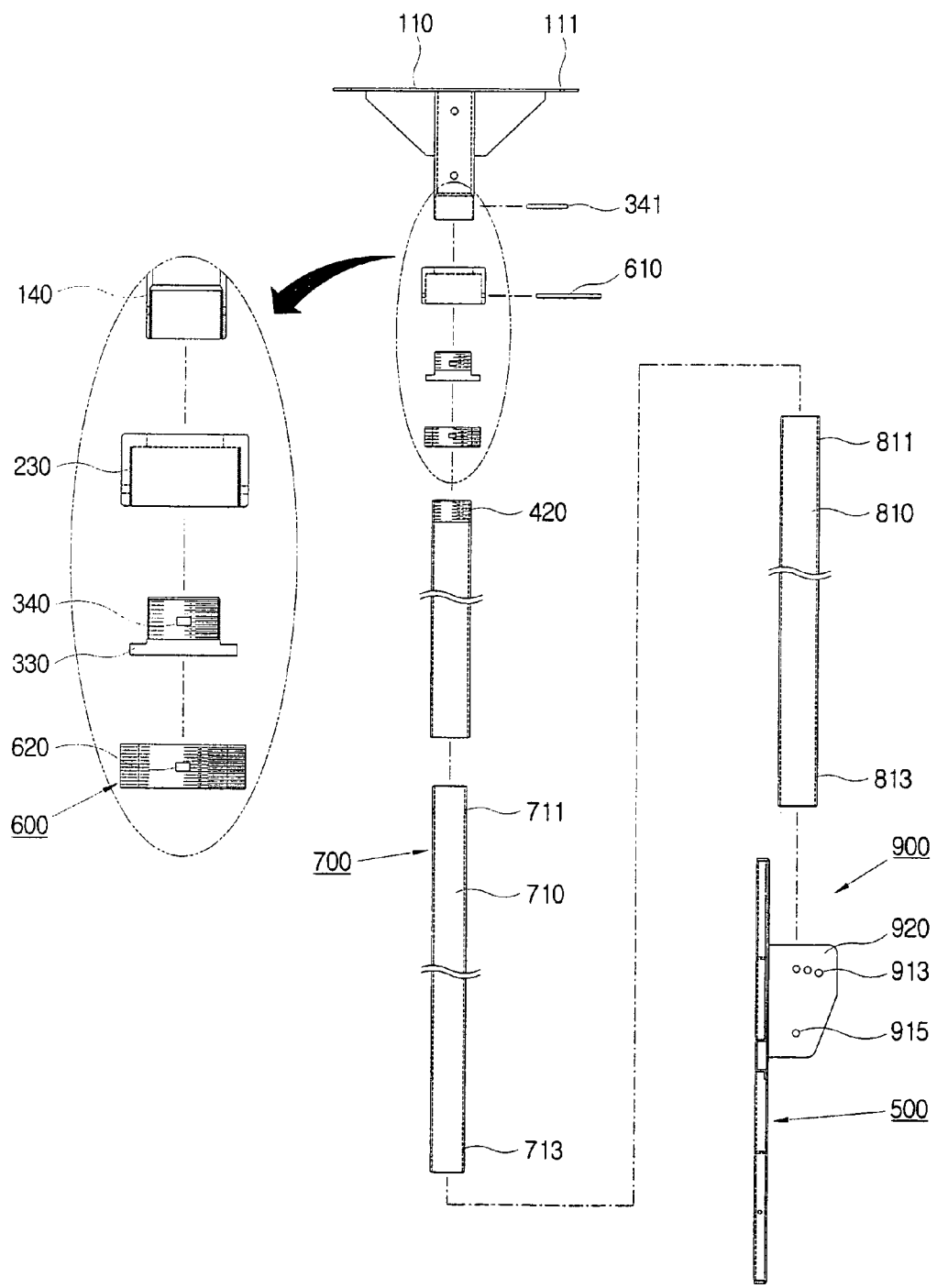
FIG. 4 shows an exploded view and a partially enlarged view of a display supporting part, according to various embodiments of the present invention.
Figure 5:
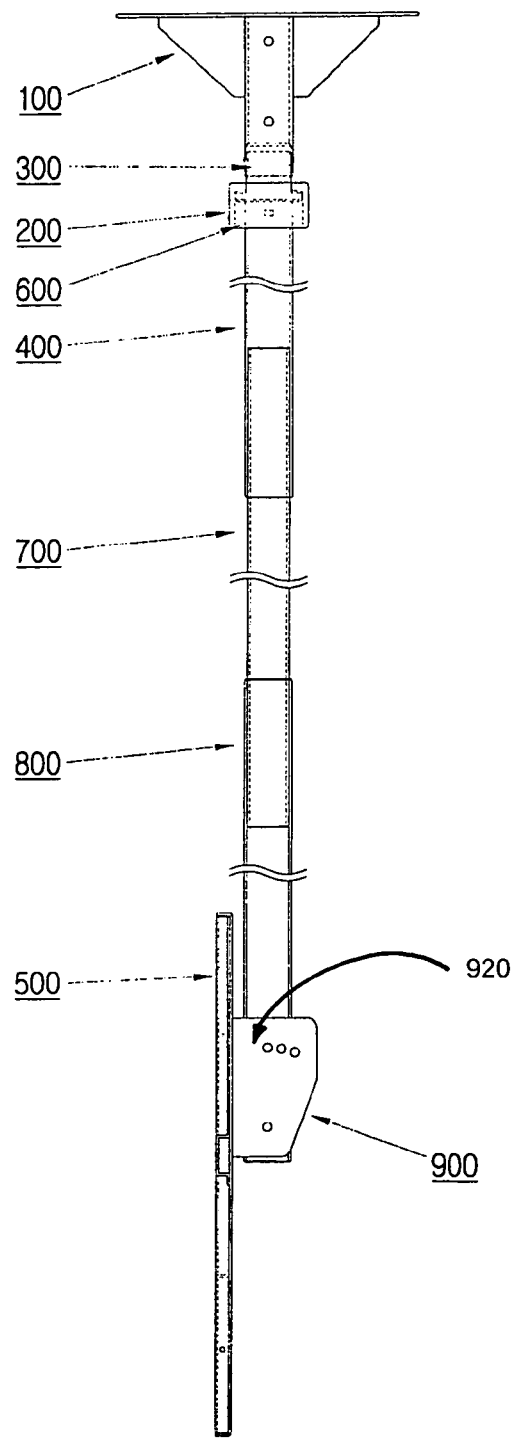
FIG. 5 shows a side view of the display supporting part of FIG. 4.

FIG. 4 shows an exploded view and a partially enlarged view of a display supporting part, according to various embodiments of the present invention, and FIG. 5 shows a side view of the display supporting part of FIG. 4.

One of the embodiments of the present invention serves to enhance the force of withstanding the weight of the display through a coupling process with screws, in addition to an engagement by engaging pins 341, 610 as described above.

As shown in FIGS. 4 and 5, a female screw 140 is provided on a bottom inside of the trunk part 120 of the upper engaging part 100, and a male screw 330 to correspond to the female screw 140 is provided on a top outside of the trunk part 310 of the flange member 300.

On an inside of the engaging part 220 of the swivel adjusting part 200 is provided a female screw 230, and a male screw 420 to correspond to the female screw 230 is provided on a top outside of the trunk part 410 of the first engaging pipe 400.

An assembling process of the display supporting apparatus according to the above-described embodiment of the present invention will be described below.

First, the flange member 300 to which the swivel adjusting part 200 is coupled is rotated in a screwing direction to combine with the bottom of the trunk part 120 of the upper engaging part 100 mounted on the ceiling. If the second engaging holes 121 of the upper engaging part 100 are rotated to correspond to the engaging holes 311 of the flange member 300 after a predetermined number of rotations, when the rotation stops, the upper engaging parts 100 and the flange member 300 are coupled by engaging pins 341 through the corresponding engaging holes 121 and 311.

The swivel adjusting part 200 and the first engaging pipe 400 are coupled in the same manner as described above.

Another embodiment of the present invention is provided with a flat face at a position in which screws are used to couple, thereby replacing engaging holes.

As shown in FIGS. 4 and 5, a flat face 340 is provided on the male screw 330 of the flange member 300.

A nut 600 has an internal diameter to provide therein a female screw to correspond to the male screw 420 of the first engaging pipe 400, and an external diameter to provide a male screw to correspond to the female screw 230 of the swivel adjusting part 200. On an outside of the male screw of the nut 600 is provided a flat face 620. In this case, it is preferable that the first engaging pipe 400 has an external diameter smaller than an internal diameter of the engaging part 220 of the swivel adjusting part 200.

By adding the nut 600 as an intermediary between the male screw 420 of the engaging pipe 400 and the female screw 230 of the swivel adjusting part 200, the first engaging pipe 400 may be coupled to the swivel adjusting part 200 even if the first engaging pipe has a smaller diameter than the swiveling adjusting part 200, so that the first engaging pipe 400 may be decreased in weight, thereby reducing the total weight to be withstood by the display supporting apparatus.

Figure 6A:
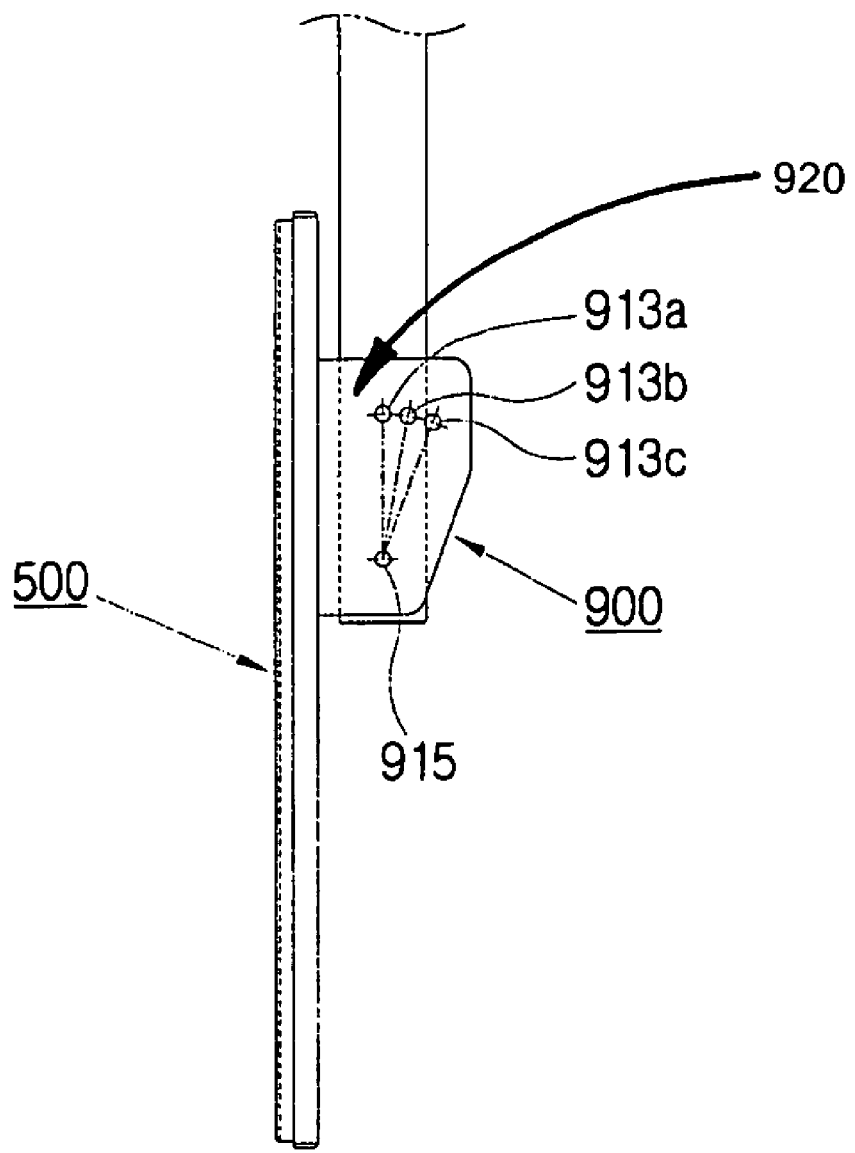
FIGS. 6A and 6B illustrate a tilting movement of the display, according to another embodiment of the present invention.
Figure 6B:
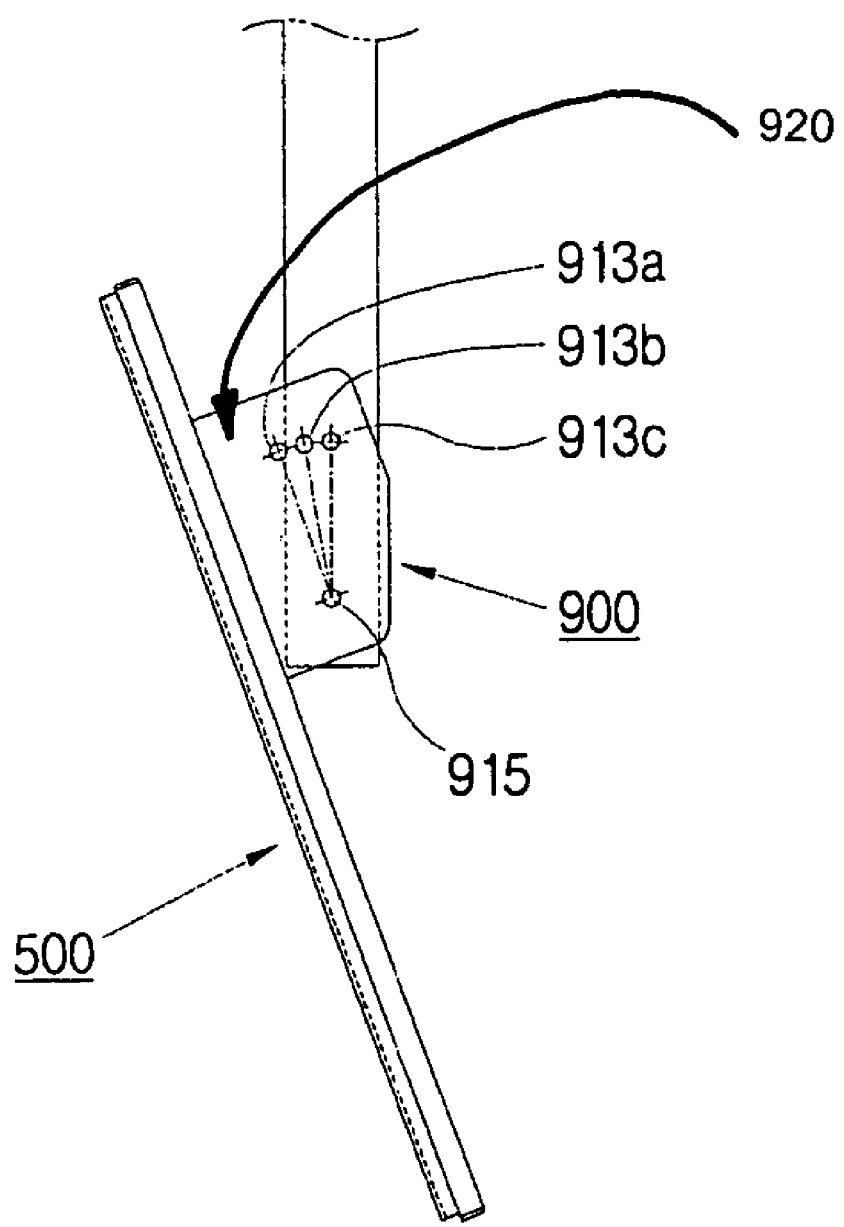

FIGS. 6A and 6B illustrate a tilting movement of the display, according to another embodiment of the present invention.

As shown in FIGS. 6A and 6B, the display supporting apparatus includes a second engaging pipe 700 and a third engaging pipe 800 for height-adjustment of the display, and are extended to be combined to the first engaging pipe 400.

Preferably, the second engaging pipe 700 is structured to be inserted into the first engaging pipe 400 to reduce a weight of the second engaging pipe 700. The second engaging pipe 700 includes a first engaging hole 711 on a top thereof to couple to the first engaging pipe 400, and a trunk part 710 provided with at least two pairs of second engaging holes 713 on a bottom thereof to couple to the display and the third engaging pipe 800.

The third engaging pipe 800 is configured so that the second engaging pipe 700 is inserted therein. Where the second engaging pipe 700 is completely inserted into the first engaging pipe 400 and the third engaging pipe 800, since the first engaging pipe 400 is in direct contact with the third engaging pipe 800, it is preferable that the diameter of the first engaging pipe 400 and the third engaging pipe 800 are equal. The third engaging pipe 800 has a trunk part 810 provided with a first engaging hole 811 on a top thereof to couple to the second engaging pipe 700, and a second engaging hole 813 on a bottom thereof to couple to the display.

As shown in FIGS. 6A and 6B, a tilt adjusting part 900 has a plate provided with a first engaging hole (not shown) to couple to the mounting plate 510 of the display mounting part 500. Bent parts 920 provided on both sides of the plate have a plurality of second engaging holes 913 to couple to the third engaging pipe 800 and to adjust the tilting of the display, and a third engaging hole 915 to couple to the third engaging pipe 800.

An assembling process of the tilt adjusting part 900 is described below.

The first engaging hole (not shown) of the plate of the tilt adjusting part 900 is located so as to correspond to the first engaging holes 511 of the mounting plate 510 of the display mounting part 500 and the corresponding holes are then coupled by engaging pins (not shown). The third engaging pipe 800 is inserted between the bent parts 920. Then, the second engaging hole 913 and the third engaging hole 915 are located so as to correspond to the second engaging hole 813 of the third engaging pipe 800 and the corresponding holes are coupled by engaging pins (not shown).

If a user desires to tilt the display to a predetermined angle, it is possible to adjust the titling of the display with the use of the second engaging holes 913*a*, 913*b*, and 913*c*.

The tilt adjusting part 900 may be formed by bending a part of the mounting plate 510 of the display mounting part 500. In this case, the plate of the tilt adjusting part 900 becomes the mounting plate 510 of the display mounting part 500, and thus, a first engaging hole 911 of the tilt adjusting part 900 and the first engaging hole 511 of the display mounting part 500 are not necessary.

According to the configuration above, the swiveling, tilting and height adjusting movement of the display are allowable with the use of the engaging pipes of the display supporting apparatus.

Thus, according to the present invention, there is provided a display supporting apparatus to support a large-sized display in a stable manner without a separate casing for the display, and which allows for swiveling, tilting and height adjustment of a display with the use of engaging pipes.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A display supporting apparatus, comprising:
   an upper engaging part mountable on a ceiling;
   a swivel adjusting part rotatably combined with a bottom of the upper engaging part;
   a flange member combined with the upper engaging part to support the swivel adjusting part;
   a first engaging pipe extended downward from the swivel adjusting part; and
   a display mounting part combined with a bottom of the first engaging pipe to mount a display thereon,
   wherein the upper engaging part comprises:
       a mounting plate provided with a plurality of first engaging holes to mount on the ceiling;
       a trunk part having a hollow projection, to project from a center part of the mounting plate and having on the bottom thereof, at least one pair of second engaging holes to couple to the flange member; and
       a supporting rib combined with the mounting plate and the trunk part to support a weight of the display,
   wherein the swivel adjusting part comprises:
       a plate provided to withstand the weight of the display and with a through hole having a diameter equal to an external diameter of the trunk part of the upper engaging part; and
       an engaging part bent downward from an edge of the plate, and being provided with at least one pair of engaging holes to couple to the first engaging pipe.

2. The display supporting apparatus according to claim 1, wherein the flange member comprises:
   a trunk part having a hollow inside, an external diameter to correspond to an internal diameter of the trunk part of the upper engaging part and provided with at least one pair of engaging holes to couple to the trunk part of the upper engaging part; and
   a flange projected from the bottom of the trunk part of the upper engaging part to support the swivel adjusting part.

3. The display supporting apparatus according to claim 2, wherein a swiveling of the display is performed based on a contact between the flange of the flange member and the plate of the swivel adjusting part.

4. The display supporting apparatus according to claim 2, wherein the upper engaging part is positioned so that the second engaging holes of the upper engaging part correspond to the engaging holes of the flange member to be engaged with engaging pins.

5. The display supporting apparatus according to claim 2, wherein:
   the trunk part of the flange member comprises a male screw on a top outside thereof, and
   the trunk part of the upper engaging part comprises a female screw on a bottom inside thereof to correspond to the male screw.

6. The display supporting apparatus according to claim 5, wherein the trunk part of the flange member is provided with a flat face on the male screw on which an engaging pin passing through the second engaging hole of the upper engaging part is seated.

7. The display supporting apparatus according to claim 6, wherein the first engaging pipe comprises:
   a trunk part having a hollow inside and an external diameter to correspond to an internal diameter of the engaging part of the swivel adjusting part;
   at least one pair of first engaging holes provided on a top of the trunk part to couple to the engaging part of the swivel adjusting part; and
   at least two pairs of second engaging holes provided on the bottom of the trunk part to couple to the display mounting part.

8. The display supporting apparatus according to claim 7, wherein:
   the trunk part of the first engaging pipe comprises a male screw on the top thereof, to enhance a force of coupling the trunk part to the swivel adjusting part, and
   the engaging part of the swivel adjusting part comprises a female screw on an inside thereof to correspond to the male screw of the first engaging pipe.

9. The display supporting apparatus according to claim 8, wherein the first engaging pipe is provided with an external diameter smaller than the internal diameter of the engaging part of the swivel adjusting part, which has an internal diameter within which a female screw corresponding to the male screw of the first engaging pipe is provided.

10. The display supporting apparatus according to claim 9, further comprising:
    a nut having an internal diameter to provide therein a female screw to correspond to the male screw of the first engaging pipe, and an external diameter to provide a male screw to correspond to the female screw of the swivel adjusting part.

11. The display supporting apparatus according to claim 10, wherein the display mounting part comprises:
    a mounting plate provided with a plurality of first engaging holes to couple to the first engaging pipe; and
    left and right engaging parts respectively having a plurality of second engaging holes to mount the display.

12. The display supporting apparatus according to claim 5, wherein the first engaging pipe comprises:
    a trunk part having a hollow inside and an external diameter to correspond to an internal diameter of the engaging part of the swivel adjusting part;

at least one pair of first engaging holes provided on a top of the trunk part to couple to the engaging part of the swivel adjusting part; and at least two pairs of second engaging holes provided on the bottom of the trunk part to couple to the display mounting part.

13. The display supporting apparatus according to claim 12, wherein the first engaging pipe is positioned so that the first engaging holes of the first engaging pipe corresponds to the engaging holes of the swivel adjusting part to be engaged with engaging pins.

14. The display supporting apparatus according to claim 12, wherein the trunk part of the first engaging pipe comprises a male screw on the top thereof to enhance a force of coupling the trunk part to the swivel adjusting part, and the engaging part of the swivel adjusting part comprises a female screw on an inside thereof to correspond to the male screw of the first engaging pipe.

15. The display supporting apparatus according to claim 14, wherein the first engaging pipe is provided with an external diameter smaller than the internal diameter of the engaging part of the swivel adjusting part, which has an internal diameter within which the female screw corresponding to the male screw of the first engaging pipe is provided.

16. The display supporting apparatus according to claim 15, further comprising:

a nut having an internal diameter to provide therein a female screw to correspond to the male screw of the first engaging pipe, and an external diameter to provide a male screw to correspond to the female screw of the swivel adjusting part.

17. The display supporting apparatus according to claim 16, wherein the display mounting part comprises:

a mounting plate provided with a plurality of first engaging holes to couple to the first engaging pipe; and left and right engaging parts respectively having a plurality of second engaging holes to mount the display.

18. The display supporting apparatus according to claim 17, wherein the second engaging holes provided on the bottom of the first engaging pipe are positioned to correspond to the first engaging holes of the display mounting part to be engaged with engaging pins.

\* \* \* \* \*